US005109352A

United States Patent [19]

O'Dell

[11] Patent Number: 5,109,352
[45] Date of Patent: Apr. 28, 1992

[54] SYSTEM FOR ENCODING A COLLECTION OF IDEOGRAPHIC CHARACTERS

[76] Inventor: Robert B. O'Dell, 602 Calmar Ave., Oakland, Calif. 94610

[21] Appl. No.: 230,172

[22] Filed: Aug. 9, 1988

[51] Int. Cl.[5] .............................................. G06F 15/66
[52] U.S. Cl. .................................................... 395/150
[58] Field of Search ........ 364/518, 521, 200 MS File, 364/900 MS File; 340/723, 735, 721, 751; 400/110, 484

[56] References Cited

U.S. PATENT DOCUMENTS

| | | | |
|---|---|---|---|
| 4,379,288 | 4/1983 | Leung et al. | 340/365 R |
| 4,505,602 | 3/1985 | Wong | 400/110 |
| 4,531,119 | 7/1985 | Nakayama et al. | 340/712 |
| 4,679,951 | 7/1987 | King et al. | 400/110 |
| 4,683,926 | 8/1987 | Yong-Min | 340/365 R |
| 4,723,217 | 2/1988 | Nakano et al. | 364/518 |
| 4,811,242 | 3/1989 | Adachi | 364/519 |

FOREIGN PATENT DOCUMENTS

| | | |
|---|---|---|
| 169922 | 9/1985 | Japan . |
| 2100899 | 5/1981 | United Kingdom . |
| 2161004 | 2/1986 | United Kingdom . |

OTHER PUBLICATIONS

*Kanji & Kana,* Wolfgang Hadamitzky and Mark Spahn, 1981, pp. 16–17.

"Extended Language Option–Japanese and Chinese Tableware", Revised: Nov. 1984, pp. 39–44, Xerox 8000 Network Systems.

Advertisement for JHL Research, Inc. of Anaheim, Calif., showing a multilingual microcomputer, 1984.

*Primary Examiner*—Gary V. Harkcom
*Assistant Examiner*—H. R. Herndon
*Attorney, Agent, or Firm*—Majestic, Parsons, Siebert & Hsue

[57] ABSTRACT

A computer input system for Chinese and Japanese characters. The different strokes for composing the characters are classified into different groups, each identified by a code number. The strings of code numbers are stored in memory where the strings contain only as many code numbers as are necessary to identify the characters. Strings for two or more characters used together as compounds are also stored. When a code number entered by an operator matches a string stored, a controller causes the shape of the actual character to be fetched from memory and displayed. For some characters, partial characters are also stored and are fetched and displayed when the string of code numbers for such partial characters matches the code numbers entered to aid beginners. The string of code numbers representing each character follows exactly a traditional; writing sequence of the character from the very first stroke to the end of the string of code numbers. However, the computer usually identifies the character before the entire writing sequence is completed, particularly for characters used together in compounds.

30 Claims, 13 Drawing Sheets

THE EXAMPLE HERE FOR THE "PARTIAL CHARACTER" FEATURE IS THE CHARACTER FOR AGE IN JAPANESE. A PARTIAL IS DETERMINED HERE ON THE SIXTH STROKE, AND SUCCEEDINGLY MORE COMPLETE PARTIALS ARE REVEALED AS KEYSTROKE ENTRY CONTINUES UNTIL THE CHARACTER ITSELF IS IDENTIFIED ON THE 13th STROKE. IT THEN APPEARS IN THE "PENDING" AREA AND WILL BE MOVED TO THE TEXT LINE BY THE SPACE BAR, IF THE OPERATOR ACCEPTS IT AS CORRECT.

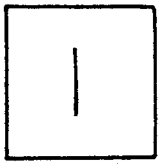

(1) ALL STRAIGHT PLAIN VERTICAL STROKES. THESE DO NOT HOOK AT THE BOTTOM.

(2) ALL STROKES WITH AN UPPER RIGHT CORNER. THESE MOVE FIRST TO THE RIGHT, THEN SHARPLY DOWNWARD. THEY MAY HOOK AT THE END.

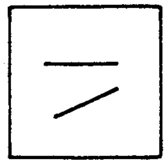

(3) ALL HORIZONTAL STROKES (STRAIGHT, LEVEL STROKES DRAWN LEFT TO RIGHT) AND ALL STRAIGHT STROKES DRAWN ON AN UPWARD ANGLE FROM LEFT TO RIGHT.

(4) ALL DOTS AND ALL SLANTING OR CURVING STROKES DRAWN FROM TOP TO BOTTOM, SLANTING DOWN TO LEFT OR RIGHT.

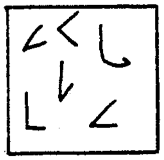

(5) ALL STROKES WITH A LOWER LEFT-HAND CORNER; THESE MOVE DOWNWARD FIRST, THEN TURN RIGHT SHARPLY.

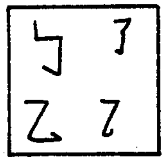

(6) ALL STROKES WITH MORE THAN ONE CORNER

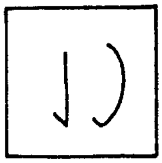

(7) ALL STROKES THAT MOVE EITHER STRAIGHT DOWNWARD, AND THEN HOOK LEFT.

FIG._1A.

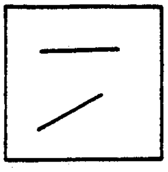

(1) ALL STRAIGHT PLAIN HORIZONTAL STROKES DRAWN FROM LEFT TO RIGHT, AND ALL SLANTING STROKES DRAWN ON AN UPWARD ANGLE FROM LEFT TO RIGHT.

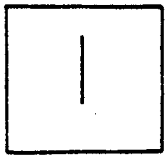

(2) ALL STRAIGHT PLAIN VERTICAL STROKES.

(3) ALL DOTS AND ALL CURVING STROKES DRAWN FROM TOP TO BOTTOM SLANTING DOWNWARDS TO LEFT OR RIGHT.

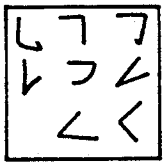

(4) ALL STROKES WITH AN UPPER RIGHT CORNER DRAWN FIRST FROM LEFT TO RIGHT AND THEN SHARPLY DOWNWARD, AND ALL STROKES WITH A LOWER LEFT HAND CORNER DRAWN FIRST DOWNWARD, STRAIGHT, OR TO THE LEFT AND THEN TO THE RIGHT.

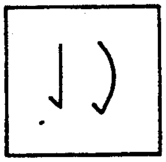

(5) ALL STROKES DRAWN EITHER STRAIGHT OR CURVED DOWNWARD, AND THEN ENDED WITH A HOOK TO THE LEFT.

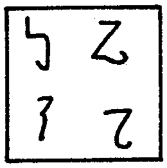

(6) ALL STROKES WITH MORE THAN ONE CORNER.

FIG._1B.

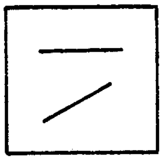

(1) ALL PLAIN STRAIGHT STROKES DRAWN FROM LEFT TO RIGHT AND ALL STRAIGHT SLANTING STROKES DRAWN FROM LEFT TO RIGHT. NONE HAVE HOOKS.

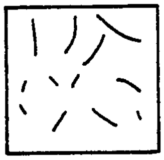

(2) ALL STRAIGHT PLAIN STROKES (WITHOUT HOOKS) OF ANY LENGTH DRAWN FROM TOP TO BOTTOM, EITHER VERTICALLY OR DIAGONALLY.

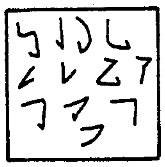

(3) ALL STROKES WHICH BEGIN STRAIGHT AND THEN TURN SHARPLY (FORMING A CORNER) ONCE, OR MORE THAN ONCE. INCLUDES ALL HOOKED STROKES.

FIG._1C.

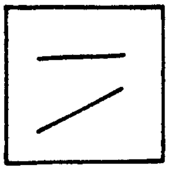
ALL PLAIN, STRAIGHT, HORIZONTAL STROKES DRAWN FROM LEFT TO RIGHT AND ALL STRAIGHT PLAIN SLANTING STROKES THAT ARE DRAWN ON AN UPWARD ANGLE FROM LEFT TO RIGHT.
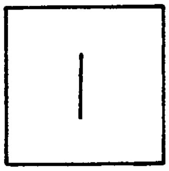
ALL STRAIGHT PLAIN VERTICAL STROKES.
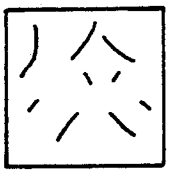
ALL DOTS AND ALL SLANTING OR CURVING STROKES DRAWN DOWNWARD TO LEFT OR RIGHT.
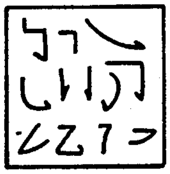
ALL STROKES THAT HAVE ONE OR MORE CORNERS. THIS INCLUDES ALL STROKES WITH HOOKS.
FIG._1D.

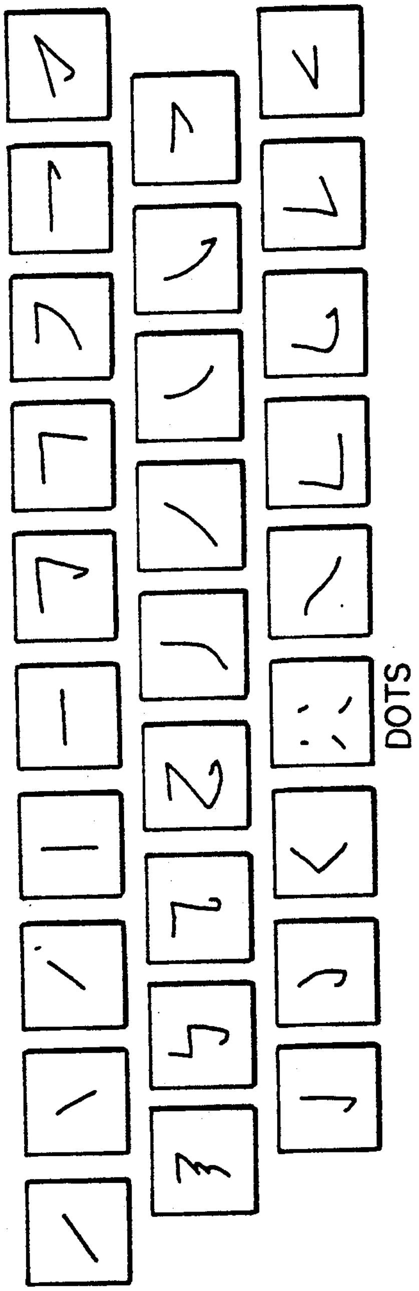
FIG._1E.
3
FIG._2A.
31
FIG._2B.
314
FIG._2C.
3144
FIG._2D.
4
FIG._3A.
42
FIG._3B.
423
FIG._3C.
4233
FIG._3D.

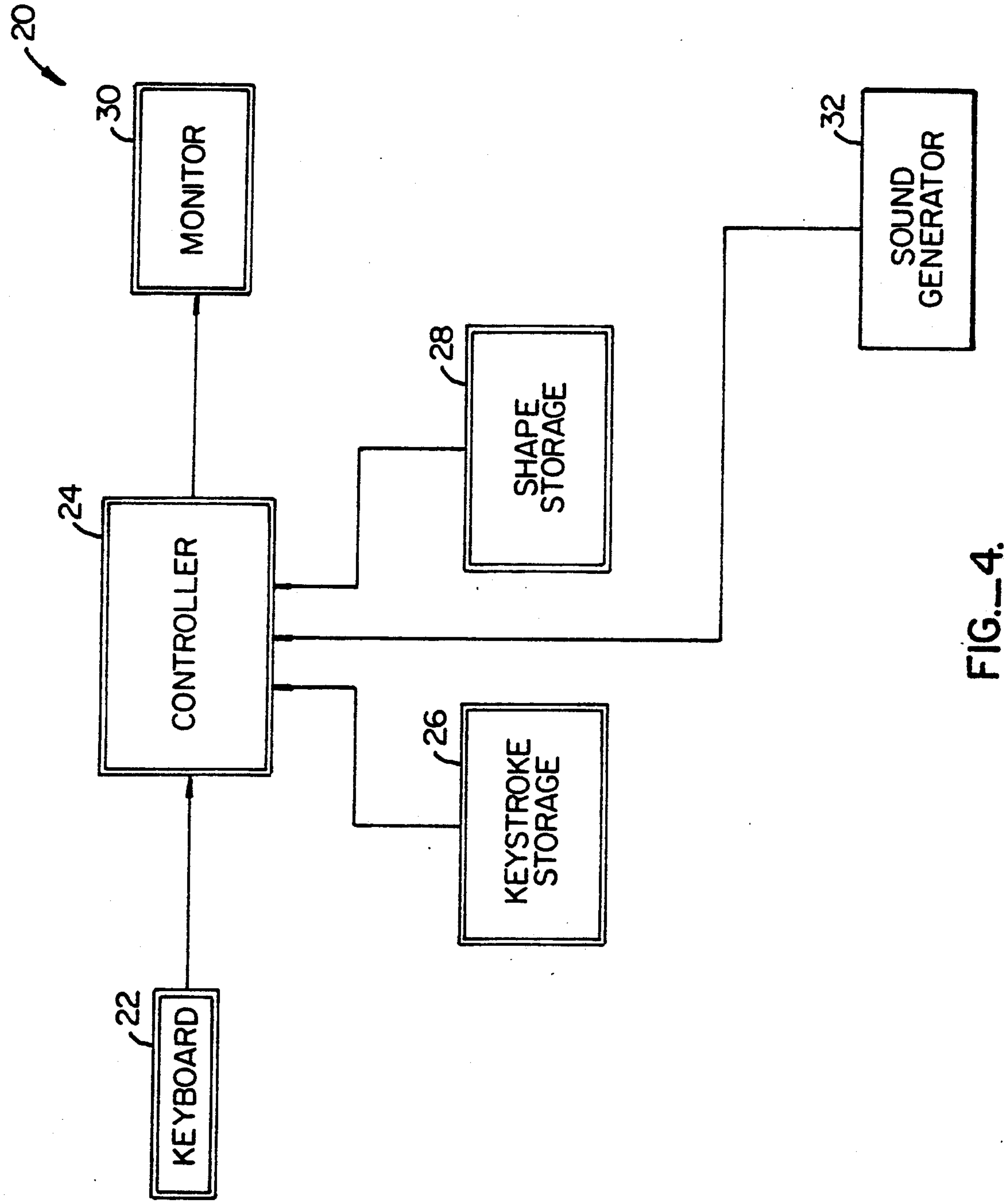
FIG._4.

CHARACTERS AND THEIR DATA STRINGS

| | |
|---|---|
| 距 | --12313131.3233 |
| 踊 | --12313132.412331 |
| 践 | --12313133.33444 |
| 路 | --123131342.4123 |
| 跡 | --123131343.4744 |
| 跳 | --123131344.4844 (OR 12313134348.44-ALTERNATE DATA STRING) |
| 踏 | --12313137.2441233 |
| 国 | --12313334.3 |
| 虫 | --1231340. (0=END OF CHARACTER KEY) THE ZERO IS A KEYSTROKE BUT IS NOT ACTUALLY STORED. |

FIG._5.

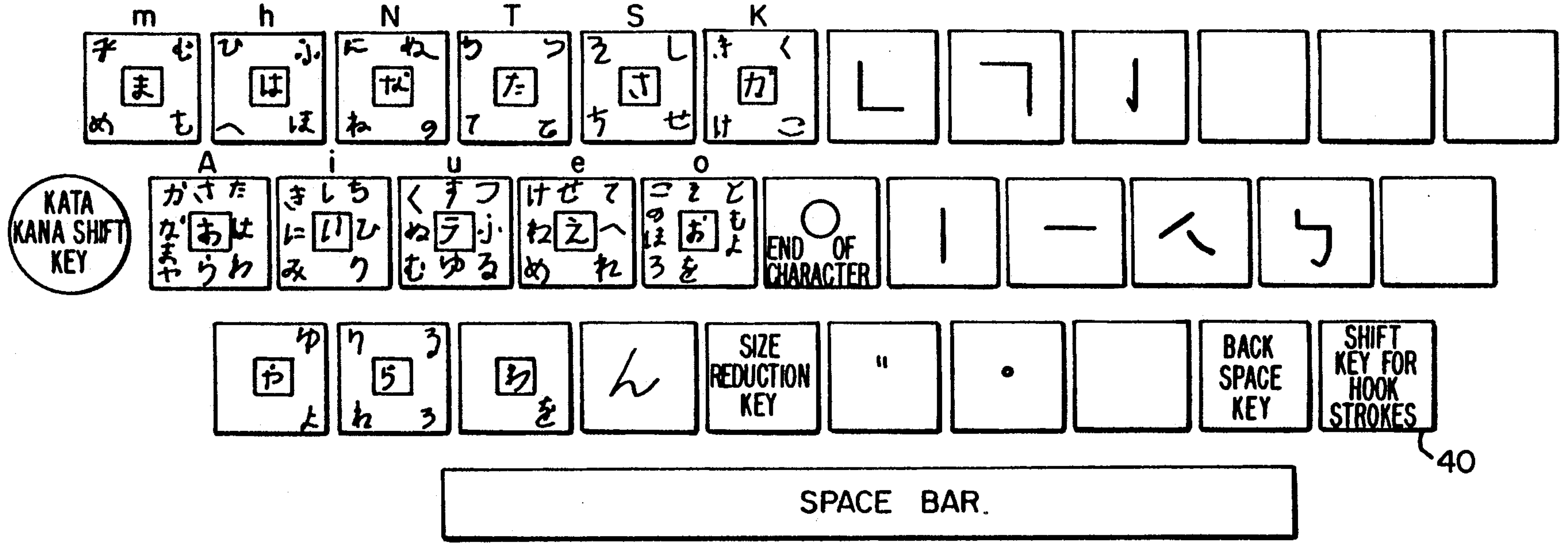

JAPANESE HIRAGANA IS SHOWN ON THE LEFT HAND SIDE OF THE KEYBOARD, IN BLACK. KATAKANA EQUIVALENTS ARE OBTAINED WITH A SHIFT KEY. THE SIZE REDUCTION KEY IS NEEDED TO DENOTE "TWISTED" SOUNDS OR INCREASED EMPHASIS ON A CONSONANT SOUND. THE DAKU-TEN AND HANDAKU-TEN KEYS ARE USED FOR THE "VOICED" SOUNDS.

CHINESE IS ON THE RIGHT SIDE OF THE KEYBOARD, IN RED.

PUNCTUATION IS NOT SHOWN.

FIG._6.

FIG._7A.
FIG._7B.
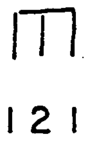
FIG._7C.
FIG._7D.
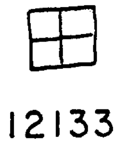
FIG._7E.
FIG._8A.
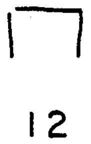
FIG._8B.
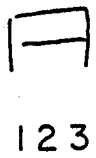
FIG._8C.
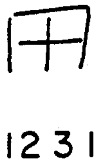
FIG._8D.
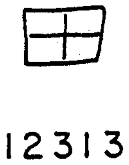
FIG._8E.
FIG._9A.
FIG._9B.
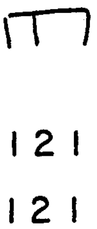
FIG._9C.
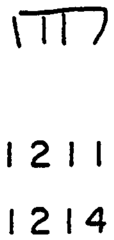
FIG._9D.
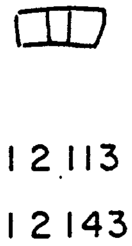
FIG._9E.

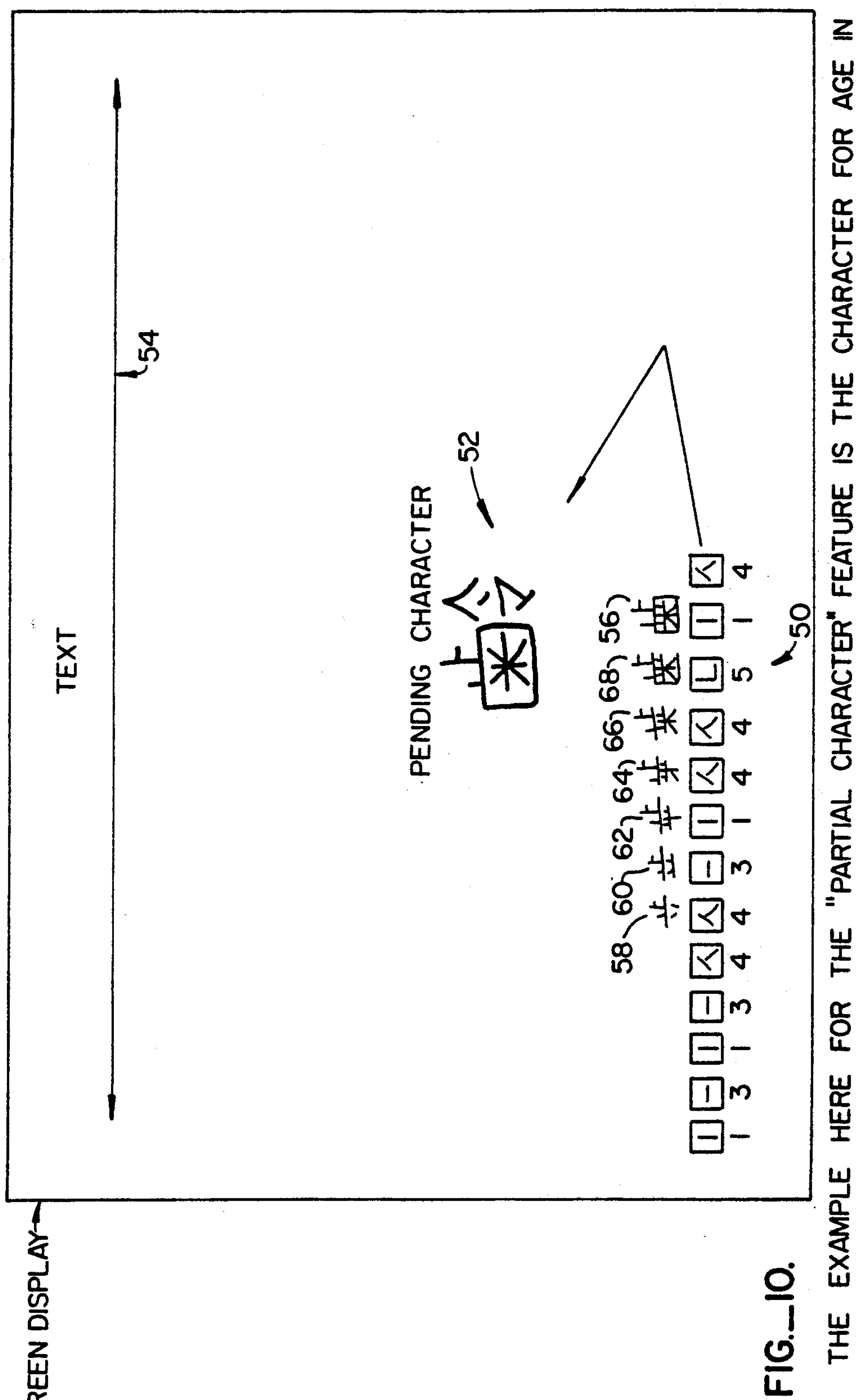

FIG._10.

THE EXAMPLE HERE FOR THE "PARTIAL CHARACTER" FEATURE IS THE CHARACTER FOR AGE IN JAPANESE. A PARTIAL IS DETERMINED HERE ON THE SIXTH STROKE, AND SUCCEEDINGLY MORE COMPLETE PARTIALS ARE REVEALED AS KEYSTROKE ENTRY CONTINUES UNTIL THE CHARACTER ITSELF IS IDENTIFIED ON THE 13th STROKE. IT THEN APPEARS IN THE "PENDING" AREA AND WILL BE MOVED TO THE TEXT LINE BY THE SPACE BAR, IF THE OPERATOR ACCEPTS IT AS CORRECT.

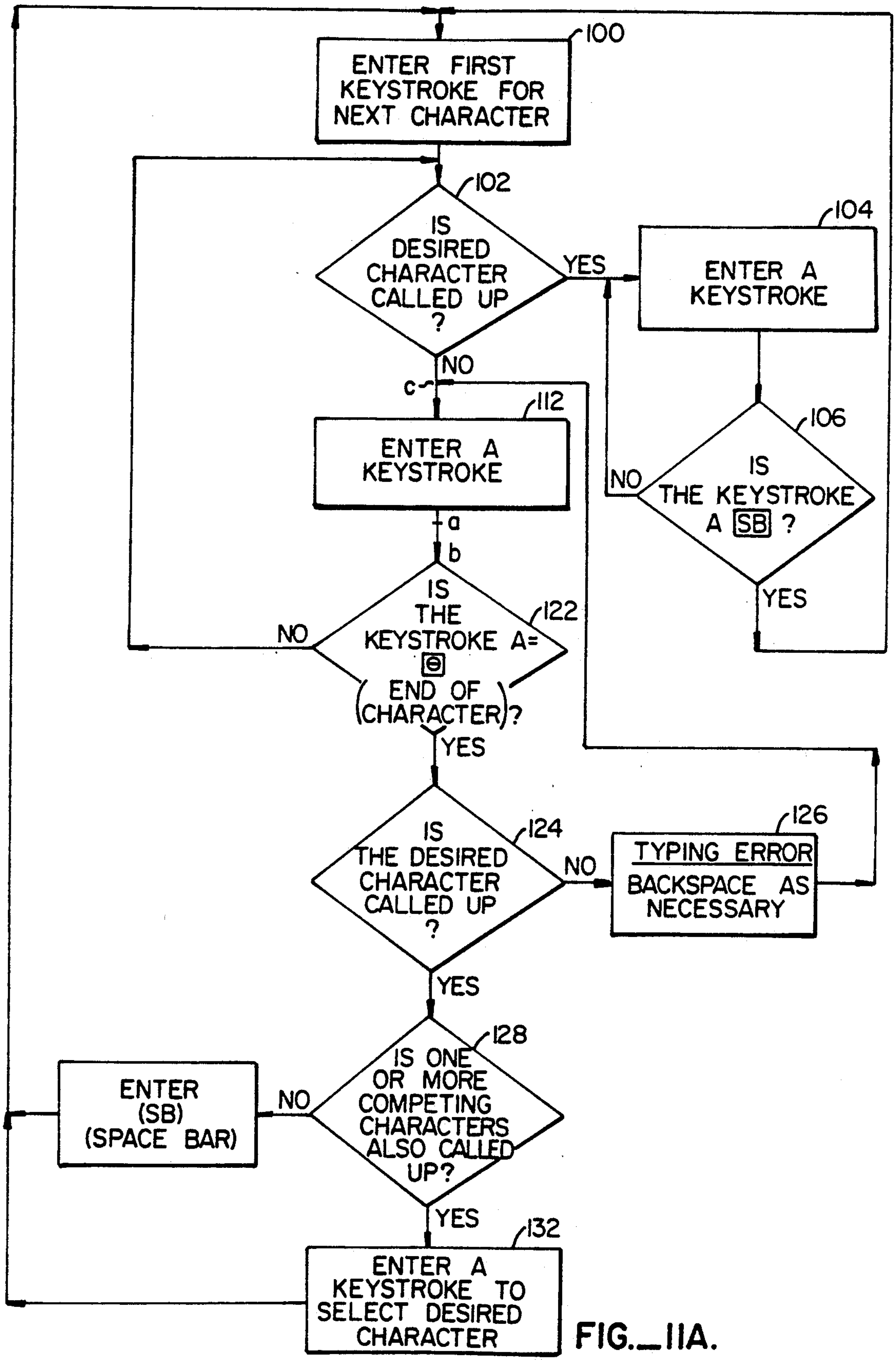
FIG._11A.

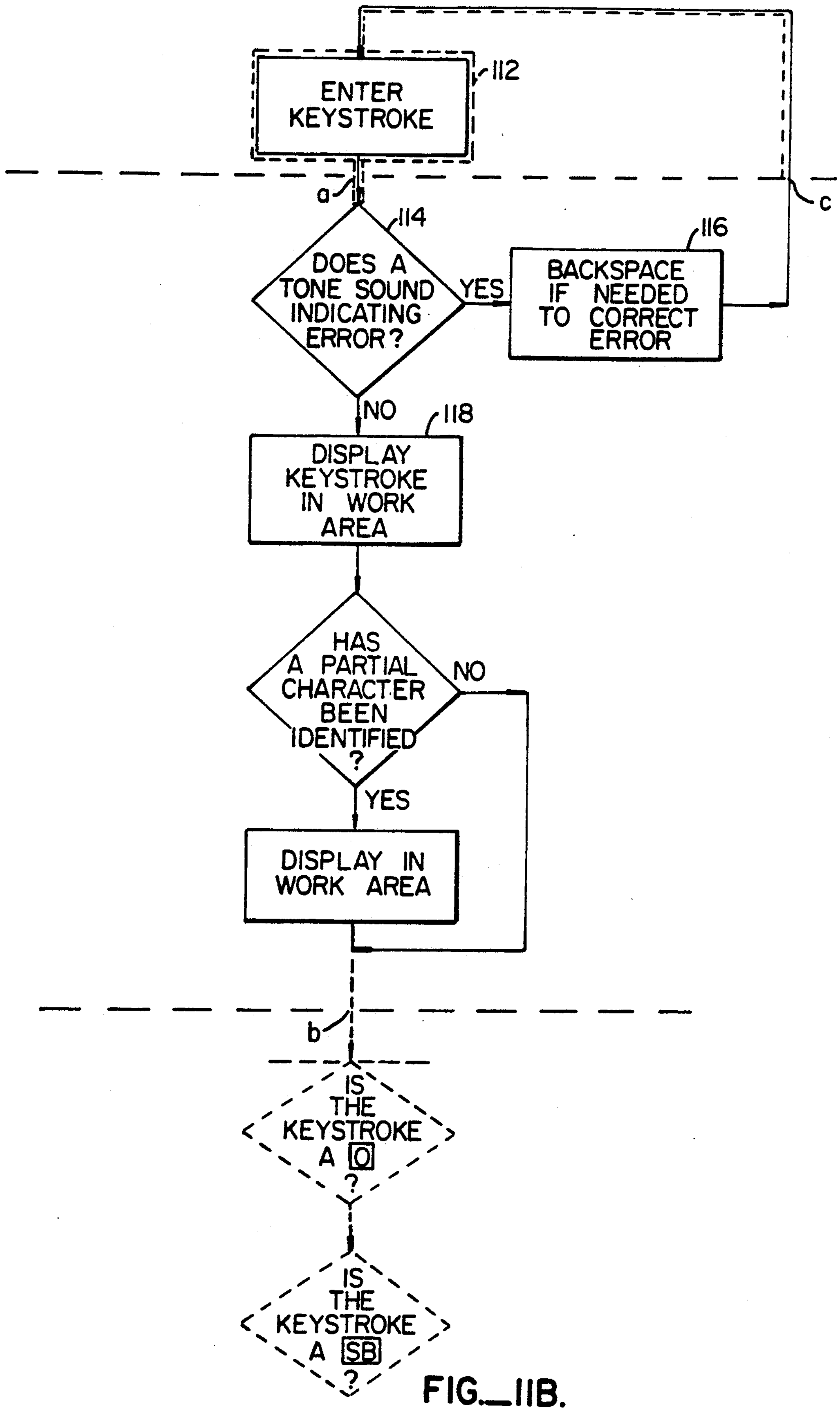
FIG._11B.

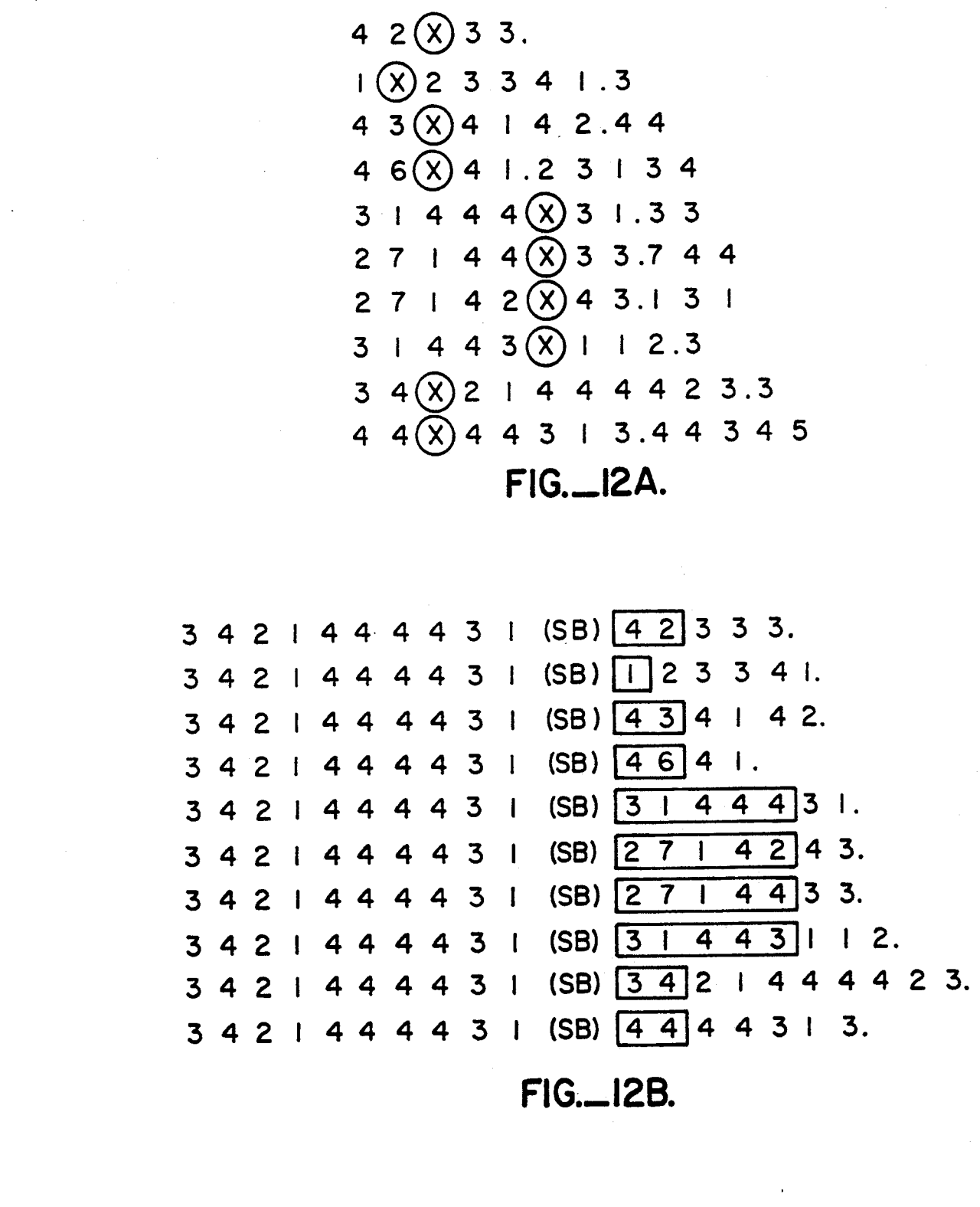

SYSTEM FOR ENCODING A COLLECTION OF IDEOGRAPHIC CHARACTERS

BACKGROUND OF THE INVENTION

This application relates in general to systems for encoding languages, and in particular to a computer system for encoding a collection of characters used in languages.

The English language uses its 26 letter alphabet to construct several hundred thousand words in left to right linear groups of varying lengths and combinations of letters. Each letter is associated with a sound. Chinese is as different as it could be. The most elementary unit in the language is said to be not an alphabet symbol but a "character"—a symbol which is usually equivalent to an English word.

Chinese characters are composed of various combinations of over 30 different pen-strokes. These strokes are not, by themselves, associated with any sound (as are the symbols of the English alphabet), and when combined to form a character, the combination is pronounced differently according to the dialect—even though universally read with the same meaning. While there are said to be as many as perhaps 50,000 characters, including ancient and very esoteric ones, most reasonably well-educated Chinese are familiar with 6000 to 8000 different characters. It has been estimated that 98% of written communication is done from a pool of only 3,000 different characters. This is not to say that most people use only a few thousand different "words", however. These characters are also commonly used in combinations of two or more to create more complex words or phrases. For example, the character for ten added to the character for moon forms a character which can mean Oct.

The major obstacle to creating a practical Chinese typewriter was that the strokes are not used in a linear fashion to construct characters, and the size or—in the case of some strokes—even their proportions vary greatly. Each character is constructed in an imaginary box of the same size as that of all other characters regardless of how many strokes are needed. This means that the same stroke can be of various lengths or various proportions as it is squeezed or elongated to fit into appropriate elements in various characters in the imaginary boxes. In order to construct a character, the needed strokes are all placed appropriately within the box—some must go in the middle, some left, some right, some on the bottom, some on the top, and some cut through the entire figure. In other words, there is no physical linearity, as with English in how the strokes are set down.

With these differences, it is not surprising that a practical typewriter, which is, after all a device built for linear, alphabetic languages, could not be successfully adapted to Chinese. With all the up and down and back and forth movements, as well as all the various sizes and forms needed for building a character from strokes or elements, an enormous keyboard would be needed to write with a one character or even a one element per key approach (requiring thousands of keys). To create a mechanical device with thousands of keys would be a formidable problem. Developments in computer technology have, however, greatly simplified this problem. It is no longer necessary to have to worry about size or shape or placement of individual strokes or elements or, alternatively, of creating a huge keyboard to accommodate thousands of characters. Matrix printers can print any symbol at all, including Chinese characters. Thousands of characters can be stored in computer memory. Once a character has been fetched from memory, it can be printed by a matrix printer. In other words, if a system for character retrieval is successfully designed for fetching characters from memory, it is no longer necessary to require a one-to-one correspondence between a keystroke and a mark on the printed page.

The issue remaining is how best to call out of electronic storage or memory the particular character to be printed or to be displayed. There have been many different approaches to solving this problem of efficient keyboard input. The most widely used input systems today for Chinese and Japanese are phonetic systems, which are time consuming to learn and to operate and are burdened with the problems of the subtle differences in pronunciation. The most prominent of these systems also require the use of an English keyboard and some familiarity with English pronunciation. There remains widespread dissatisfaction with these systems, however, and the search for a better solution continues.

A non-phonetic input method, and one of the earliest successful approaches was that of Wang Laboratories which, in 1979, made available an input system based on a 3-cornered analysis of 10,000 characters. Using the computer keyboard's number pad the operator keyed in 2 numbers for each of three corners of a given character; the number varied for each corner according to its configuration. This gave each character a 6 digit data storage or code which meant the proper character could be fetched from an electronic dictionary. There was some duplication in these data strings, about 6.6% of 10,000 characters; in these cases a choice then had to be made. Since the method required a great deal of memorization of corner shapes and their associated codes, the system is difficult to learn and tiring to apply.

The Wang system does illustrate an important difference between computer and typewriter: the computer does not require a one to one correspondence between a keystroke and a mark on the paper. Because of this, it is possible to use a string of symbols (data string) such as a string of numbers to represent the consecutive keystrokes of a character for fetching the character out of dictionary storage for printing or display.

A different approach to the input problem, also using data strings, is that of Li, disclosed in UK Patent GB2100899, and in an earlier system created by Jiang Zheng. In the case of Jiang, the immediate purpose was only the creation of a new method of organizing a Chinese dictionary, perhaps to be followed eventually by computer application. Jiang's system is described in pp. 379–387 of *Character Indexes of Modern Chinese,* by N. H. Leon, Scandinavian Institute of Asian Studies Monograph Series, No. 42, Curzon Press. Both Li and Jiang rely, at least in part, on numerically coding the strokes that make up a given character as the means for creating a data string that will uniquely identify the character. To do this, both bunch the 30 or so different possible strokes into a small group of stroke categories each of which is given a single digit code. Perhaps because of the nature of the strokes, there is at least partial similarity in the categories chosen. There are differences as well. Grouping the strokes into categories will, of course, make a smaller keyboard, and one that is easier to learn. But the main goal should be categories that are clearly distinct from each other; secondarily, they should not create a great number of duplicate data strings. In general, too few categories increase duplications; too many create unnecessary and often confusing fine distinctions. Li has eight categories, represented on a keyboard by eight keys. Six of these categories are groups of single strokes, (i.e. the pressing of the key for any such group will cause the numerical coding of one stroke to be entered), while two are combinations of strokes (i.e., the pressing of one of these keys causes two strokes to be entered; pressing the other produces a three stroke combination). These two combinations can also be constructed using the strokes in the six categories of single strokes. Thus the operator must be alert to not use the keys for single strokes to build these two combinations, but to use the two appropriate keys instead. Diagonal strokes are divided into two categories: left-falling and right-falling. Dots are included in the diagonals that fall to the right. Strokes with only one corner are divided into clockwise and counterclockwise; the categorization of strokes with more than one corner is unclear.

Jiang has six categories of single strokes, and, unlike Li, has no categories for combinations of strokes. His categories differ from Li's in two major respects: he separates dots from right-falling diagonals (they are in a category of their own) and he lumps "turning strokes", or strokes with corners, into a single category.

Jiang's system, the earlier of the two, creates its data strings by applying the system's stroke categories to a character's strokes as they are laid down in the usual writing order. If the first stroke to be written is in category 2, the first number in the string is 2; if the next is in category 6, the next number in the string is 6 (the string becomes 26), and so on up to a maximum of six strokes per character (plus the first and last strokes as tiebreakers if more than one character has that data string). The data string begins with the first stroke and ends with the sixth for characters having up to ten strokes, but the string begins with the sixth and ends with the eleventh for characters having more than ten strokes.

Li's input system uses a graphic or positional rule for deciding on the order of the digits representing the categories rather than a rule based on the order in which one writes the strokes. This is stated to have the advantage of permitting one who is not conversant with Chinese to use the input system, as well as the advantage of eliminating the problems that would be caused in his system by variation in stroke order among operators, and the advantage of reducing duplications. Li limits the maximum length of any data string of digits for a character to nine digits in cases of duplication of data strings; but the normal number of digits is expected to be six. Thus, for complex characters, this coding scheme requires the operator to discard certain strokes.

Both Li's and Jiang's stroke systems result in a data string that is usually no longer than Wang's (six strokes for most characters), and Li, at least, claims significantly fewer duplicate strings than Wang shows (1.2% vs. 6.6%). Like Wang, however, Li and Jiang have created short data strings at the expense of ease of operation. The central issue for the computer operator that results from any categorization of strokes is deciding the appropriate category for each stroke of a character; error, indecision, and delay easily result from any ambiguities. Li's categories create operator confusion by having not only six categories for strokes but two additional categories for combinations of some of those same strokes in the six categories. He also puts dots in the same category with right-falling diagonals and yet some dots are left-falling or vertical. And he makes no clear provision for handling strokes of more than one corner. Jiang's separate category for dots is no better, since dots can sometimes be confused with short diagonals. And creating separate categories for right-falling and left-falling strokes has been found in my research to increase operator error. Also, his lumping of all corner strokes together needlessly increases duplications.

An even more serious problem confronting an operator of Li's or Jiang's approaches is caused by their rules for skipping strokes in certain situations. In order to limit the data strings to six digits, Jiang requires that the operator count the number of strokes in the character before input begins if the operator is unsure whether there are fewer than ten strokes in the character; this is required because the operator must begin the string at either the first stroke or the sixth, depending on the total number of strokes. He must also count his input carefully so as not to enter less or more than six where appropriate. This is slow, error prone, and very trying.

Similarly, in order to limit the data string to six digits, Li's system, like Jiang's, also requires the operator to skip many strokes in any complex character. Where a complex character includes two or more roots, a maximum of three digits are allocated for each root; if a complex character has more than three roots, the fourth and higher roots are simply discarded. A person operating the input system would have to look up or have to be familiar with what strokes or roots should be discarded for complex characters. Like Jiang, Li also requires exactly six strokes for each character; Li's system is therefore also quite burdensome for the operator. Li requires the operator to use a positional rule for stroke order which is confusingly similar to traditional writing order, but which differs from such order and yields data strings different from strings obtained using the traditional writing order. Thus for operators to whom the traditional writing order has become second nature, Li's system requires such operators to un-learn the traditional writing order and replace it with Li's confusingly similar positional rule. Altogether Li's system is very difficult for the operator.

The systems proposed thus far for the input of ideographic characters such as Chinese characters are not entirely satisfactory. They are hard to learn and to apply, and are needlessly slow. It is therefore desirable to provide an input system where some of the above described difficulties are alleviated.

The Japanese language has common roots with the Chinese language. Many Chinese characters are used in the Japanese language, although some of such characters, known as Kanji, may be written slightly differently than their Chinese counterparts of the same meaning. In addition, Japanese also employs the Kana, a 46 symbol syllabary with two versions, Katakana and Hiragana. An input system adapted for entering Japanese must therefore be capable of entering the Kana as well as the Chinese characters. Several centuries ago, the Japanese arranged their Kana in a "50-sounds table". In time, the 50 sounds has been reduced to 46. Thus in some existing Japanese computer input systems, the 46 sounds can be entered through 46 individual keys on the keyboard, each key for one sound. However, because of the complexity of having to use 46 keys, such systems have not gained wide acceptance. The most widely used Japanese computer input systems convert the 46 sounds phonetically to English so that an English keyboard can be used for entering the Japanese Kana. This is not only slow, but is an impediment to potential Japanese operators who are not familiar with the English language. It is therefore desirable to provide an encoding system for Japanese Kana with improved characteristics.

SUMMARY OF THE INVENTION

The Wang system, Jiang's approach, and Li's patent have each tried to make possible the identification of most Chinese characters with six keystrokes. Ease of learning and ease of operation have been sacrificed for shorter data strings. In English, the operator does not try to pare down each word so that he enters only a key portion of it. Instead he merely starts at the beginning of a word and types it out fully, straight through, in proper sequence, to the end; this appears to be one of the fastest language entry systems in the world. My invention has applied this approach to Chinese.

The invention is based on the conclusion that the best data string is one derived from a traditional writing order used when making a character with pen, pencil, or brush.

The different strokes used are first classified into different groups, each group given a code number for identification The data string or string of code numbers is created by using the proper keys to enter the code numbers for the groups in the proper sequence—because even though the strokes are not laid down in a linear fashion spatially as is done with English letters, their sequence is "linear in time". That is to say that we are taught in school that in order to make an English word we lay down certain letters in a prescribed sequence. In Chinese one is taught that in order to make a given character we lay down certain strokes in a prescribed sequence. The differences are that the English word is spatially linear and can be any physical length, while in Chinese all characters have the same imaginary size in the imaginary box, and so linearity exists only in time, not in space. Even though some personal idiosyncrasies develop and there are some school-based differences in various parts of Asia, there is a remarkably high degree of uniformity in the order in which adults lay down the strokes when printing any given character. In Japan, where about half of the symbols in a newspaper article are typically Chinese characters, students are taught a stroking sequence that is dictated by the Japanese Ministry of Education. Yet so traditional is the stroking that the stroking sequence taught in Taiwan is the same as that taught in Japan with more than 90% of the characters. This is, of course, very different from Li's understanding in GB2100899 in which it is stated that "a rule based on the order of writing the strokes may not be [unique] since there is no really universal rule for the order of drawing out a Chinese character."

As noted above, Jiang was willing to use a traditional writing sequence, but only in a severely restricted way. This invention truly substitutes key for pen, and always lets the operator begin at the beginning of the character and stroke directly through to the end—unless the computer identifies the character before he finishes (as it usually does), in which case he can immediately begin the next character. This invention also uses this straightforward sequential-ordering of stroke-category derived data to take advantage of the fact that a character is most commonly not independent of those around it. It most frequently is part of a "compound"—a group of two or more characters which, when used together, have a specific meaning created by the conjunction of the characters, such as the word "blackboard" in English. Because of this juxtaposition, less keyboard entry is ordinarily necessary for subsequent characters in a compound than would be the case if the character(s) stood alone. This compound feature is also used to greatly reduce duplicaton. Furthermore, this "straight-through" stroke entry also permits the display of successively more complete portions of the character ("partial characters"), as the character develops, sometimes stroke for stroke, much as an English word develops as it is typed.

Most important for speed of entry, the system does not require the operator to make the frequent and often difficult judgments that slow down other input approaches, this also greatly reduces learning time. Instead of requiring a great many judgements by the operator in order to limit the data string to six keystrokes, this invention puts the responsibility for minimizing the input string, and thus further minimizing the input time, on the computer. This is accomplished within the computer in several ways: 1) it stores "unique length" data strings—that is, it usually does not require that the operator enter the full number of strokes he would have to make with a pen or pencil, but only as many as are necessary to identify the character; 2) the "compound feature" greatly reduces further the number of strokes needed for the second and subsequent characters in most compounds; 3) the compound feature reduces the number of duplicate data strings to a level far below that of the more complicated input methods. The practical effect of these features is reduction of the number of keystrokes needed to call out the average character to about five, which is about the same number needed to type the average English word used in most writing. It is also one less stroke than the systems mentioned above. A further benefit of these features is that their reduction of the number of strokes needed significantly reduces the chances of operator input error, by simply reducing input.

Two other features of this invention further simplify its use. The first is a very helpful feature: The application of the stroke categories has been made even simpler by the addition of alternate data strings which produce the display of the desired character even in most cases where the operator has made a reasonable but improper selection of stroke category for one or more strokes in a character.

Second, a "partial character" display usually shows part of a character before the character is completed—which greatly reassures the beginner.

The invention provides easy categorization of strokes, produces very few duplicates, results in shorter data strings on average; requires no decisions—except stroke category—that do not have to be made when making characters with a pen or pencil; and, in fact, requires, on average, less than half the strokes that are necessary with pen or pencil.

One aspect of the invention is directed towards an apparatus for encoding a collection of characters, each character composed of one or more strokes written in a traditional writing sequence to make the character. The apparatus comprises first means for storing a plurality of strings of code numbers, where the strokes in the collection are classified into a plurality of groups of one or more strokes, each group corresponding to a predetermined code number, each code number in a string representing one of the strokes in the corresponding group. The code numbers in each string are in the same order as the traditional writing sequence so that each string always begins with the code number for the first stroke of the traditional writing sequence and follows that sequence without interruption until the end of the string is reached. For at least some characters in the collection, the strings representing such characters contain fewer code numbers than the number of strokes in such charcters. The apparatus further comprises second means for storing the shape of the character, display means for displaying the shapes of the characters in the second storing means and means for enabling an operator to enter code numbers. The apparatus also comprises controller means for comparing the code numbers entered by the operator as they are entered to the strings in the first storing means and for causing the display means to display the shape of a character from the second storing means when the code numbers entered by the entering means uniquely identify said character.

Another aspect of the invention is directed towards an apparatus for encoding Japanese Kana characters which include Japanese consonant and vowel sound characters. The apparatus comprises means for storing the shapes of the characters and data strings corresponding to each character, wherein each data string comprises a vowel sound character or a vowel sound character and a consonant sound identifier. The apparatus also comprises display means for displaying the shapes of the characters in the storing means, means for enabling an operator to enter the data strings and controller means. The controller means compares the data strings entered by the operator as they are entered to the data strings in the storing means and for causing the display means to display the shape of a character from the storing means when the data string entered by the operator uniquely identifies said character.

BRIEF DESCRIPTION OF THE DRAWINGS

FIG. 1A is a table of seven groups of different strokes, where each group is given a numerical code to illustrate the preferred embodiment of the invention.

FIGS. 1B–1E are tables of groups of different strokes, where each group is given a numerical code to illustrate alternative embodiments of the stroke categories of the invention.

FIGS. 2A–2D are graphical illustrations of a traditional writing sequence of the Chinese character for "wood" and code numbers for representing the strokes in such Chinese character using the classification system of FIG. 1.

FIGS. 3A–3D are graphical illustrations of a traditional writing sequence for the Chinese character for "moon" and the code numbers representing the strokes in such Chinese character using the classification scheme of FIG. 1.

FIG. 4 is a block diagram of an apparatus for implementing an encoding system using the classification system of FIG. 1 to illustrate the preferred embodiment of the invention.

FIG. 5 is a graphical illustration of some of the content of the keystroke storage and shape storage of FIG. 4 to illustrate the preferred embodiment of the invention.

FIG. 6 is a schematic view of a keyboard for FIG. 4 to illustrate the preferred embodiment of the invention.

FIGS. 7A–7E, 8A–8E are graphical illustrations of two different traditional writing sequences for the character for "field" in Japanese and Chinese respectively to illustrate one aspect of the preferred embodiment.

FIG. 9A–9E are graphical illustrations of two possible stroke sequences for the character for "four" to illustrate another aspect of the preferred embodiment.

FIG. 10 is a view of the screen on the monitor of FIG. 4 to illustrate the preferred embodiment.

FIGS. 11A, 11B together form a flow chart to illustrate the steps for operating the system of FIG. 4 for encoding characters to illustrate the preferred embodiment of the invention.

FIGS. 12A, 12B are graphical illustrations of the content of storage 26 of FIG. 4 for illustrating the compound feature of the preferred embodiment of the invention.

DETAILED DESCRIPTION OF THE INVENTION

My research concluded that the best keyboard is one in which all strokes are grouped such as shown in FIG. 1A. FIG. 1A is a table setting forth the seven categories of strokes for Chinese characters to illustrate the preferred embodiment of the invention.

As shown in FIG. 1A, the possible strokes used in Chinese characters or Japanese Kanji characters are grouped into seven groups, with most of the possible strokes within each group shown within a square, with each group given a code number. Referring to group 3, for example, the code number 3 represents one of two possible strokes: a straight stroke drawn left to right or a straight stroke on an upward angle from left to right. The classification system of FIG. 1A and its application is believed to be clearer than those of Li, shown in GB2100899 and than those of Jiang. For example, Li's system makes no clear provision for complex stroke such as those in group 6 in FIG. 1A. Furthermore, Li's classification adds two categories which represent not single strokes, but combinations of two or more strokes. Jiang's classification adds to the number of duplications by grouping all turning strokes together, and also confuses the operator unnecessarily with three different categories for dot, left-falling diagonals, and right-falling diagonals.

It will be understood that versions of the classification system different from those of FIG. 1A are possible and may be used instead. For example, groups 2 and 5 in FIG. 1A may be grouped together as one group instead of two, resulting in the total of six groups of strokes rather than seven, as illustrated in FIG. 1B. One classification scheme would group together all straight downward strokes into one group, all straight strokes drawn left to right into another, and all strokes with corners into a third, resulting in a total of three groups in reference to FIG. 1C. A similar scheme of some value would separate the second of these categories into separate categories for diagonal downward strokes and vertical downward strokes, for a total of four categories in reference to FIG. 1D. Duplication for any of these schemes is reduced if a means such as a shift key 40 of FIG. 6 is employed to differentiate strokes in these categories that end with a hook. In reference to FIG. 1C, for example, if the stroke to be entered is a horizontal or slanting stroke in group 1 where the stroke ends with a hook, the operator simply presses the key for group 1 together with the shift key 40 to effectively enter such stroke. Another much different scheme would not categorize, but would simply lay out various commonly recognized separate strokes on keytops, much as is done with the English alphabet, in reference to FIG. 1E. Ultimately, of course, the choice of a classification scheme for the different strokes should depend on the ease of use by operators and the number of duplications. In general, a greater number of duplications is seen with fewer categories, and greater operator indecision results from more categories.

FIGS. 2A-2D are graphical illustrations of a traditional writing sequence for the Chinese character "wood" and the code numbers for encoding the strokes in such Chinese character in accordance with the classification scheme of FIG. 1A. The progression from FIG. 2A to FIG. 2D illustrates a traditional writing order for the Chinese character for "wood". Thus, the character begins first with a horizontal stroke, followed by a vertical stroke, then by a curved stroke from top to bottom slanting down to the left and lastly by a curved stroke from top to bottom slanting down to the right. In reference to FIG. 1A, the horizontal stroke is in group 3, the vertical stroke in group 1, and the slanting strokes to the left and to the right are in group 4. Therefore, the Chinese character can be represented by the string 3144, where the order of the coding follows the traditional order for writing the character. Using the traditional order is advantageous since the most likely users of the system are Chinese or Japanese speakers who would automatically know the order for inputting characters by reference merely to the simple classification scheme of FIG. 1A.

FIGS. 3A-3D illustrate the strokes arranged in the traditional writing sequence for the Chinese character for "moon" using the classification scheme of FIG. 1A. Again the progression from FIG. 3A to FIG. 3D illustrates graphically the strokes for writing the character "moon". The code numbers underneath the character or partial character illustrate the code numbers representing such character or partial character. Thus, the string of code numbers representing the character for "moon" is 4233, according to the classification scheme of FIG. 1A.

FIG. 4 is a block diagram of a system for encoding a collection of characters employing a classification scheme such as that in FIG. 1A to illustrate the preferred embodiment of the invention. As shown in FIG. 4, system 20 includes a keyboard 22 which enables an operator to enter strings of code numbers such as those illustrated in FIGS. 2D, 3D, in the orders illustrated in FIGS. 2A-2D and 3A-3D. The strings of code numbers entered are compared by a controller 24 to those stored in keystroke storage 26. Upon discovering a string in storage 26 that matches the one entered through keyboard 22, the character represented by such string is then fetched from shape storage 28 and displayed at monitor 30. In the embodiment of FIG. 4, the strings of code numbers and the shapes of the characters are stored in two separate devices, it being understood that they can be stored in a single device. In one implementation, the graphic shapes of characters are stored at particular addresses in storage 28 and storage 26 stores a table which lists such addresses against the strings of code numbers for the corresponding characters. Thus, if controller 24 finds a string in storage 26 that matches the one entered by the operator, the particular address corresponding to such string is then used to fetch the character from storage 28. In a different implementation, strings of code numbers and the shapes of the characters may be stored in the same storage; such implementation is also within the scope of the invention. While in the preferred embodiment, the string of code numbers representing a character does not include all the code numbers representing the full sequence of strokes for all characters, it will be understood that longer strings are within the scope of the invention.

FIG. 5 illustrates the contents of storage devices 26 and 28. FIG. 5 contains nine Japanese Kanji characters and the strings of code numbers representing such characters set forth immediately to the right of each character in accordance with the classification scheme in FIG. 1A. In reference to FIG. 5, it will be observed that seven of the characters share a common root which appears on the left side of each of the seven characters. In the traditional writing order of these characters, this root is first written before the other portions of the characters. For this reason, the beginning seven code numbers in each of the seven strings are identical. Beginning in the eighth code number, however, the strings diverge.

This invention utilizes the discovery that, when classified in accordance with the classification scheme of FIG. 1A, most Chinese characters and Japanese Kanji characters can be uniquely identified by strings of code numbers where the number of code numbers is usually less than the number of strokes in the character. In reference to the top character in FIG. 5, for example, the string 12313131 is adequate in identifying the character and the remaining four code numbers 3233 are really not necessary for identifying the character. For this reason, an operator need not enter the entire string but can simply stop after entering 12313131 since uniqueness has already been established at that point. Thus the task of the operator is simplified and the contents of storage 26 can be reduced. In reference to FIG. 5, the code numbers in each string to the left of the period are adequate for identifying each of the corresponding characters so that the code numbers to the right of the period are not necessary for entry to identify the character. In the preferred embodiment, only the code numbers to the left of the period are actually stored in storage 26 so that the size of the storage can be reduced.

FIG. 6 illustrates in more detail the keyboard of FIG. 4. As shown in FIG. 6, the keyboard 22 includes seven keys where each key is for the entry of any stroke within a particular group of strokes, according to the classification scheme of FIG. 1A. In addition, keyboard 22 includes an end of character key labelled "o". This key is useful for a number of reasons. For example, the bottom character in FIG. 5 is the Japanese Kanji character for "insect". Such character, however, also appears as a portion of many other characters, particularly those related to insects, where such portion is known as a "root". Therefore, if the string of code numbers entered is 123134 and no code numbers are entered thereafter, it is ambiguous as to whether entry of the character "insect" is intended or the entry of another character including the root "insect" is intended and that more code numbers are forthcoming. Therefore to uniquely identify the character "insect", the operator simply presses the end of character key when he completes the character; this addition to the data string uniquely identifies most such characters. The end of character key need only be pressed when an operator encounters the end of the string of code numbers representing a character. Where uniqueness is established at an earlier point such as in all the characters in FIG. 5 except for the bottom one for "insect", controller 24 causes the character to be displayed at the monitor 30 even before the entry of the entire string of code numbers for such character is completed.

In reference to FIG. 5, since uniqueness has already been established when the operator has entered the code numbers before the period, the entry of code numbers to the right of the period will have no effect on system 20. Hence any input errors the operator makes for entries to the right of the period will have no effect in slowing down the operator This improves input efficiency.

When the operator sees the character desired at the monitor 30, the operator presses the space bar to move it to the text line. Thus, in the preferred embodiment, controller 24 will ignore the code numbers entered after uniqueness has been established but before the character is accepted; the character is accepted by pressing the space bar. Pressing the space bar also notifies controller 24 that the code numbers entered thereafter are those for building the data string for the next character and should not be ignored.

For a few characters, more than one writing sequence may be common. This is illustrated in reference to FIGS. 7A–7E, 8A–8E. FIGS. 7A–7E illustrate the traditional writing sequence used by Japanese for the character "field". FIGS. 8A–8E illustrate the traditional writing sequence used by Chinese for the same character "field". Storage 26 of FIG. 4 stores both strings of code numbers 12133, 12313 as representing the character "field". Hence, when either string is entered through keyboard 22, controller 24 will cause the character "field" from shape storage 28 to be displayed at monitor 30. For some characters there are common variations within the same language. These are also easily dealt with by simply allowing access through more than one data string. There is plenty of room statistically to permit this; most characters do not require it.

For certain strokes within some characters, some operators may classify such strokes in one category whereas other operators may view such strokes as belonging to a different category. FIGS. 9A–9E illustrate one particular Chinese character in which one of the strokes may be easily classified as belonging to one category as well as to another. As shown in FIG. 9D, the fourth stroke in writing the Chinese character "four" can be classified as belonging either to group 1 or to group 4 of FIG. 1. To enter the string of code numbers for the character "four", some operators will enter 12113 whereas other operators will enter 12143. Storage 26 stores both strings as representing the same character so that when the operator enters either string, the character "four" will be displayed at the monitor 30. The features illustrated in FIGS. 7A–7E, 8A–8E, 9A–9E render the system 20 highly tolerant of differences in classification of strokes and of the existence of different writing orders. This feature is particularly useful for helping beginners in learning the system.

In reference to FIG. 5, for example, listed against the sixth character from the top, or the character "jump", are two strings of code numbers; both strings are stored in storage 26 so that entry of either string will retrieve the same character and cause the same character "jump" to be displayed at the monitor.

FIG. 10 is the front view of monitor 30 to illustrate the preferred embodiment of the invention. As shown in FIG. 10, the screen display on monitor 30 includes three areas: a work area 50, a pending character area 52 and a text area 54. As the strokes are entered by the operator through keyboard 22, the entered strokes are displayed in the work area 50. It will be observed that the actual tops of the keys that were struck are displayed in sequence instead of code numbers, so that the operator of the system need not even be aware of the code numbers and can simply identify typing errors by looking at the strokes displayed in the work area. Controller 24 identifies each stroke entered with a code number, and determines from a comparison of the string of code numbers entered to strings stored in storage 26 whether a particular character has been uniquely identified. Once this happens, such character is retrieved from shape storage 28 and displayed in the pending character area 52 on the display screen of monitor 30. When the operator sees that the character shown in the pending character area is the character desired, the operator hits the space bar shown in FIG. 6 and causes the character in the pending character area to be moved to the text area 54. By providing a work area 50, an operator can check the actual strokes entered to discover any mistakes and to erase those by a backspace key shown in FIG. 6.

Many Chinese characters and Japanese Kanji characters can be further broken down into "roots". As a further aid to operators, storage 26 also stores the strings of code numbers for such roots and strings of code numbers of portions of such roots and causes roots or portions of such roots to be displayed in the work area 50 when they have been uniquely identified. Such roots and root portions will be referred to simply as partial characters.

Also illustrated in FIG. 10 is the display of such a partial character for the Japanese Kanji character "age". When entering this character, the operator starts at the upper left portion of the root 56 in the character. It will be understood that in work area 50, only the actual key caps signifying the strokes will appear in work area 50 and not the numerical codes of such strokes. For ease of description in this application, however, the numerical codes are also listed underneath the key top type stroke display on the screen display, it being understood that such code numbers are really not necessary or shown on the display itself. Upon the entry of the sixth stroke which has the code number 4, the root 56 which has the code number string 131344314451 has already been identified by controller 24 from a comparison of the string 131344 with the strings of code numbers for partial characters stored in storage 26. Controller 24 then causes the monitor to display a portion of the root 56 composed of the six strokes entered so far. In order to enable the portions of the root to be displayed, storages 26, 28 store not only the root 56 and its string but also different portions of the root 58–68 together with the strings of code numbers corresponding to each of such portions. Thus when controller 24 discovers the string of code numbers entered 131344 to be the same as that stored in storage 26 for the portion of partial character 58, controller 24 will cause the portion 58 to be retrieved from shape storage 28 and displayed in the work area 50 of monitor 30.

Portions 58–68 of the root 56 and their corresponding strings of code numbers may be stored in the same manner as the full characters in key stroke storage 26 and shape storage 28. In other words, portions 58–68 as well as the partial character 56 are stored in shape storage 28 while the corresponding strings of code numbers are stored in storage 26. After the string 131344 has been entered, resulting in the display of portion 58, the operator next enters the key stroke with the code number 3. Controller 24 identifies the string 1313443 in storage 26 and fetches portion 60 from the shape storage 28 and causes it to be displayed in area 50 as shown in FIG. 10. Portions 62–68 are identified and displayed sequentially as the operator enters the code numbers 1445 in the same manner. Then the operator enters the next code number 1 which completes the root 56, at which point root 56 is also displayed in the work area. The entry of the next code number 4 uniquely identifies the Kanji character "age". Controller 24 causes such character to be fetched from storage 28 and displayed in the pending character area 52 of monitor 30 in the manner described above for the display of uniquely identified characters. By pressing the space bar on the key board of FIG. 6, the operator can cause the character displayed in the pending character area to be entered in the text area 54, thereby accepting the character.

The above-described feature for displaying partial characters is particularly useful to operators who are not entirely familiar with the encoding system because it will build the character on-screen as the data is entered. For some characters the operator will actually see that as each stroke is entered, it is added to the character displayed in the working area so that the operator can feel reassured that he or she is on the right track.

Chinese characters are most commonly used in groups of two or more. These compounds create different words or phrases that are not represented by any single character. For example, when the Chinese character for frost 霜 is followed by 夜 the two together, in Japanese, mean frosty night Similarly, when the character for frost is followed by 囲, the two together mean frostbite. An exhaust of the compounds which begin with a given character are listed after that character in dictionaries. This presents the opportunity to reach beyond single characters and create longer data strings in which the second and subsequent characters can usually be described by short extensions onto the data string of the first character. When the characters are stored like this together sequentially in the apparatus of this invention, a great advantage in speed and efficiency of input is achieved. For example, for the character "frost" mentioned above we can list ten entries which when they follow "frost" to create a compound are very easily handled. The data strings of these ten (without showing the string for "frost") are listed in FIG. 12A. Each number shown in the data strings represents one stroke (selected according to the appropriate stroke category). The entire string in each case shows the number of strokes a person would have to make if printing the character with a pen, pencil, or brush. The period in each string shows the length of data string needed to uniquely identify each character (using the apparatus of this invention) when any of the characters is used independently, that is, not as a subsequent character in a compound. The (x) in each data string shows the length of data string needed to identify these characters when used in a compound preceded by the character "frost". The median number of strokes needed to draw these ten characters by hand is nine strokes. The median number of keystrokes needed to identify them as independent characters with this apparatus is seven. The median number of keystrokes needed to identify them as a character following "frost" is two keystrokes.

The key to accomplishing this is simply in the storage. "Frost" is stored as 3421444431 (saving seven strokes over the hand-made version). The ten other characters associated with this character as subsequent characters forming compounds are simply stored beyond this data string as an extension of it in the storage structure. See FIG. 12B.

In FIG. 12B, the notation SB is for space bar which is the key used in the preferred embodiment of the apparatus to accept a character offered to the operator by screen display. The boxed number following the SB are the keystrokes necessary to identify and display these characters as second characters in a compound with frost (3421444431). The numbers to the right of the boxed numbers are the remainder of the data string that is ordinarily needed to identify those characters as independent characters, rather than as second characters in compounds; the purpose of retaining this part is so that the controller can determine if the operator does not actually want this character and is simply looking for a character independent of "frost" that forms no compound with it. For example, after frost is accepted by the operator's pressing the space bar, if the next stroke is a 1, then the character 囲 ("surround") is displayed in the pending character area, because it is the only character in the group of compounds beginning with "frost" that starts with a 1. If the operator wants it, he accepts it by striking the space bar, and so creates "frostbite" on the text line, by having added it to "frost". If however, the operator did not want that character, but instead another character starting with 1, which then is clearly not one that forms a compound with "frost", such as 業 ("occupation" or "business") which has a unique data string of 114—then when he strikes the second 1 in the string he wants, the controller determines that the data string has departed from the data string of the character displayed whose second code number is 2 (the complete stored string is 1233341 as seen in FIG. 12B). And, as can be seen from FIG. 12B, there is no other string that begins with 1 that connects with "frost". Since the string has departed from any possible compound string, the controller causes the display to erase the offered character. In this case the computer searched both for a two-character compound (call it AB) and a different independent character (call it B').

In cases where a specific two-character compound AB has been established and one or more three-character compounds ABC exists, then when entry of the data string for the next character begins the computer will not only see whether the string matches that for a third character C in a possible compound ABC, but will also see if it matches that of any second character C' in some compound BC' that exists, or whether it is an independent character C''. The search for an ABC or a BC' may, of course, end immediately if the first stroke entered does not begin a data string for a C in any of the possible ABC compounds or a C' in any possible BC' compounds. And, of course, the search for either of these compounds is similarly terminated if at any later point in entering data for that character the data string diverges from all of the possible C characters or C' characters that can form compounds with AB and B respectively. However if a C or a C' is found before a C'', it will be offered to the operator. If after it is offered, he continues to enter data, and the data string being created departs from that of the offered character, not only will the character be erased but no further search will be made on that compound when the data for the next character is entered. For example, if, when searching for ABC, BC′, and C″, the operator was seeking a C″, then when he starts entering the string for the next character, D, the computer does not search for an ABCD or for a BCD′, but only for a possible CD and a possible D′; since ABC and BC′ were rejected in favor of C″, they no longer offer valid possibilities as data string beginnings. This then constantly automatically adjusts the number and length of possible applicable compound strings, and therefore limits the number of searches required of the computer when any data is being entered.

Since most Chinese characters are written as a part of a compound (especially so with complex material) this feature can be a significant time saver; and since the number of entries is reduced, the number of possible errors is also reduced. Even greater efficiencies from this "compound feature" are often found where a compound consists of more than two characters. For example, the compound that makes "electron microscope" is composed of five character (電子顯微鏡. It begins with the character for electricity. The character for electricity supplemented by the character for child gives the compound that means electron. The string of code numbers for electricity is 342144441233. The string of code numbers for child is 273. However, when the character for child follows that for electricity to form the compound meaning electron, only the first two code numbers will be required for entring the string for child. Thus the string of code numbers for the compound meaning electron is 342144441233/SB/27, where /SB/ represents the key that accepts the character and moves it to the text line.

While there appears to be little savings in this case, in identifying a compound string for electron instead of identifying two separate strings for the individual characters, there is great savings for identifying the five character compound for electron microscope. The five characters include the two characters for electricity and child, and three additional characters. These three additional characters together would require over 50 strokes if done by hand. Thus, if the five characters were identified separately by five separate strings of code numbers, entry of a large number of keystrokes will be required for uniquely identifying the five characters individually. By identifying the compound string for the five characters as a whole, one needs to add only two more strokes to the compound string for electron to establish the five-character compound as unique by controller 24. The full string for the five-character compound is 342144441233/SB/27/SB/1/SB. The first SB accepts the character for electricity and the second SB accepts the compound, electron. The code number 1 following the second end of character key identifies the character for "plain" or 637 clear", the third character in the five character compound, because nothing else in the strings for compounds stored in storage 26 has such a combination of code numbers. And, since the third character does not follow the first two without itself being followed by the fourth and fifth characters, the fourth and fifth characters are offered along with the third—all for a single keystroke, the last "1" in the string. Thus approximately 50 strokes have been saved in the entry of the five character compound. The number of code numbers in the string for the five-character compound happens to require one less keystroke than does the term in English.

It can happen that the operator does not want to enter electron microscope; instead the third character to be entered after the word "child" is totally unrelated to the two previous characters. In such event the operator simply keeps typing and the last three characters in the five-character compound will be erased and be replaced by the unrelated characters actually desired by the operator.

The problem of duplication occurs when a string of code numbers entered corresponds to more than one character. Such problem appears to be inherent in any coding systems for Chinese characters that are "dictionary-based", that is, where a data string calls a character from storage. When this happens the most commonly used of these characters will be sent to the screen on monitor 30; at the same time one or more less commonly used alternative characters are shown in parenthesis alongside the most commonly used character so that the operator can make a choice by a single keystroke.

The number of duplications is greatly reduced by the "compound" feature of the invention. Most writing with Chinese characters is done less with single characters than with characters in combination—"compounds". This permits a sizeable and rich means of communication to be built from the knowledge of only a few thousand single characters. The educated Japanese may know perhaps 3 to 5 thousand individual characters (each usually is equal to an English word), and the Chinese probably twice that number, but they recognize tens of thousands more words and phrases created from various combinations of these characters. These compounds are, of course, unique, and since their strings of code numbers are generally longer, and more complex than single characters, the probability of duplication is much lower. Furthermore a character which when standing alone has a duplicate, is unlikely to create a duplication problem when in combination with one or more other characters. For example, the character for power has the same code number string as the single character for knife or sword, but when combined with other characters there is rarely a conflict. This is so, because it will combine with few other characters in the same way that the character for knife will, since their individual meanings are different.

This greatly diminishes the duplication problem, compared to other systems—Wang has 6.6%; Li claims 1.2%. Because of the high frequency of compound use in writing aimed at adults, duplication rates for this invention are less than 0.5%, diminishing even further as the material gets more complex.

The compound feature of this invention, discussed at length above, can be used in any dictionary based computer language system—that is, one in which a data string calls a symbol or word out of storage. It can certainly also be used with a language such as English where one chose to store phrases, or in any language such as German where more complex words are commonly constructed by grouping simpler words.

FIGS. 11A and 11B together are a flow chart illustrating the operation of system 20 to illustrate the preferred embodiment of the invention. As shown in FIG. 11A, after initiation, a first keystroke is entered (block 100). Controller 24 checks to see if the string of a single code number entered matches any string stored in storage 26. If a matching string is found, the corresponding shape of the character represented by such string is fetched from storage 28 and is displayed on monitor 30

(diamond 102) and a tone sounds to indicate that a character is pending, or, alternatively, a voice generator pronounces the offered character or compound. The sound or voice is generated by a generator 32 in FIG. 4. If a desired character is displayed, controller 24 checks to see if another keystroke is entered (block 104). If the next keystroke is a space bar (diamond 106), this means that the character displayed is the one desired by the operator. In such event controller 24 causes the character to be entered and displayed in the text area 54 of the monitor and controller 24 returns to block 100 to monitor keystrokes entered for the next character. If the next keystroke is not a space bar, this indicates that the character displayed in the pending character area may not be one desired by the operator and controller 24 returns to block 104 to check further keystrokes.

If after entering the first keystroke in accordance with block 100 a desired character is not displayed, the operator will simply enter another keystroke (block 112). At point a, controller 24 enters the partial character display subroutine of FIG. 11B. In reference to FIG. 11B, if the keystroke entered in accordance with block 112 causes the string to be different from any string stored in storage 26, controller 24 will cause a sound to be produced by generator 32 indicating error and an error message to be displayed (diamond 114). If the tone does indicate error, the operator will backspace (block 116); at point c the routine returns to the flow chart on FIG. 11A where the operator enters another keystroke (block 112) to erase the previous entry and to enter the next keystroke. If no error is indicated the keystroke will be displayed in the work area 50 (block 118). Controller 24 checks to see if the keystroke entered matches the string for any partial character in storage 26. If no such string is found, controller 24 proceeds to point b in the flow chart of FIG. 11A. If a string is indeed found, the partial character identified by such string is displayed in the work area 50 and/or a completed character is displayed in the pending character area as explained above.

Returning now to FIG. 11A at point b, controller 24 checks to see if the keystroke entered is a space bar (diamond 122). If the keystroke entered is not a space bar, controller 24 simply returns to diamond 102. If the keystroke entered is a space bar, controller 24 checks to see if the string of code numbers representing the keystrokes entered matches any strings stored in storage 26. If no string is found so that no character is displayed on monitor 30, this indicates that there has been a typing error (diamond 124). An error message will be displayed on monitor 30 and a tone sounded to indicate to the operator that a typing error has been made. In such event the operator can back space and erase one or more of the previous entries and return to block 112 to continue from where the error was made or back space completely and start over again. If the character displayed on monitor 30 is not the one desired, again this indicates typing error; an error message is again displayed so that the operator can correct the mistake. If controller 24 does find a matching string representing the desired character so that the desired character is displayed on monitor 30, the operator will observe to see if more than one choice of character is displayed (diamond 128). This occurs when there are duplications; as explained above, this occurs infrequently. If no competing character is called up, the desired character is found so that the operator can move the character into the text line by pressing the space bar. If a competing character is displayed in the pending character area, a keystroke selects one and erases the other(s) (block 132). Upon selecting one of the competing characters, controller 24 returns to block 100 to monitor the keystrokes for the next character.

Japanese Kana

A complete entry system for Japanese requires that the operator be able to access the Kana, as well as Chinese characters. There are two versions of the Kana—the Japanese "syllabary"—two sets of corresponding symbols, each of which makes it possible to write any Japanese word phonetically or to expand on a Chinese character word stem. The two are called Hiragana and Katakana. Hiragana comprises about 45% of an average newspaper article, Katakana perhaps 5%. (The other 50% is Chinese characters; there can be a smattering of English as well, depending on the material). In appearance, Katakana is the much more angular of the two; it looks somewhat like simple Chinese characters. It is used largely for foreign words and names and for a few other special purposes. Hiragana is much more cursive in appearance; it seems to owe nothing in its appearance to Chinese.

Each version of this syllabary has 46 symbols, each of which denotes a particular sound. Each has a corresponding symbol in the other version. Some additional sounds are obtained by various means: The "voiced" sounds such as ga (instead of ka) by addition of nigori identifiers, or diacritical marks, (") and (° ); the "twisted" sound such as kyo (not ki-yo) by adding a smaller version of a particular symbol, such as a small や to き ; by preceding some consonants with っ in order to double the consonant; or by adding a "vowel" Kana to lengthen a vowel sound.

Consequently the Kana section of the keyboard of this invention in its preferred embodiment offers both of the Kana, a size reduction key, and a key for each of the diacritical marks. It also, of course, provides keys for punctuation much as it does for the Chinese characters.

Several centuries ago, the Japanese arranged their syllabary in a "fifty-sounds table" in order to facilitate learning. The fifty-sounds table is shown on pages 16, 17 of *Kanji & Kana: A Handbook and Dictionary Of The Japanese Writing System*, by Hadamitzky and Spahn, Charles E. Tuttle Company, Rutland, Vt. and Tokyo, Japan, 1981; the table on pages 16,17 is incorporated herein by reference. The table is made by arranging consonant sounds down the table, and vowel sounds across. For example, in the (K-Row) then we have in order, Ka, Ki, Ku, Ke, Ko (as we would render them in English); and in the (M-Row) we have Ma, Mi, Mu, Me, Mo. The table is still widely used today, but now there are only 46 sounds. This device is used here as the basis for the Japanese side of the keyboard in FIG. 6; it permits condensation of the needed number of keys. While 46 keys could be used for the 46 sounds, they are awkward to reach and may also require the use of part of the Chinese side of the keyboard. Consequently three rows of keys are used for the Kana. The top row is 6 "consonant" keys, the bottom row is 4 "consonant" keys, and the middle row is 5 "vowel" keys. The five possible combinations with vowels are shown on top of each consonant key; for example (Ka, Ki, Ku, Ke, Ko) is shown by かきくけこ] on a single keytop. Similarly each vowel has all possible uses of that key (up to ten) shown on the key top—the most prominent of which is the vowel sound itself, (such as あ or (a), in English).

The "vowel" keys may be colored differently from the "consonant" keys. Each "consonant" symbol (or sound) can be accessed by striking in succession the two keys that have that symbol on the top. One will be a "consonant" key, the other, a "vowel" key. Although there are some advantages to permitting the operator to strike the two in either order, there are disadvantages as well. So, the preferred embodiment of the invention requires the operator to strike the "consonant" key first. "Vowels" alone (unlinked to consonants) can be called up by a single keystroke. Size reduction is obtained by holding down the size reduction key while striking the desired keys. The dash that is used to indicate vowel lengthening for Katakana is a separate key. The Kana keyboard is normally in the Hiragana mode. The Katakana equivalents are obtained by a shift key.

The Japanese side of the keyboard in FIG. 6 is summarized in sets A, an B below.

| HIRAGANA |
|---|
| SET A |
| All Hiragana are placed on 15 keys in a grouping inspired by the 50 sounds table: |
| All hiragana with an "a" sound in them are grouped on one key (10 Hiragana) |
| All hiragana with an "i" sound are grouped on a key (8 Hiragana). |
| All hiragana with a "u" sound are grouped on a key (9 hiragana). |
| All hiragana with an "e" sound are grouped on a key (8 hiragana). |
| All hiragana with an "o" sound are grouped on a single key (10 hiragana) |
| SET B |
| All hiragana beginning with a "k" sound are grouped on a single key (5 hiragana) |
| All hiragana beginning with an "s" sound are grouped on a single key (5 hiragana) |
| All hiragana beginning with an "n" sound and followed by a vowel are grouped on a single key (5 hiragana) |
| All hiragana beginning with an "h" sound are grouped on a single key (5 hiragana) |
| And similarly with all with "m", "y", "r" and "w" sounds. |
| Although "y" and "w" have only 3 and 2 hiragana respectively |

Then there is the solitary end of syllable "n" sound.

To get required "constant" hiragana you hit the appropriate kay in set B first, then the key in set A: two keys can get you any "consonant" hiragana—vowels need only 1 hit (that from set A) as does the end of syllable "b" sound.

From the above, it is evident that all 46 sounds of hiragana and katakana can be entered using the Japanese side of the keyboard in FIG. 6. The fifty-sounds table is already familiar to those who know the Japanese language so that learning to use the keyboard and the entry system of this invention is simple to such persons. According to the invention, each of the 46 Japanese consonant and vowel sound characters is identified by a data string comprising a vowel sound character or a vowel sound character and a consonant sound identifier. The Japanese sound characters for twisted sounds (the "yo-on") such as the "kyo" in "Tokyo" and nigori (for the "voiced" sounds), also may include reduced size identifiers for twisted sounds and/or nigori identifiers in addition to vowel sound characters and consonant sound identifiers. Such data strings are no more than those shown in the fifty-sounds Table. By employing such a scheme for encoding and entering the 46 Japanese sound characters, the system is easy to use and has fewer keys than existing Japanese encoding systems employing 46 keys, one for each sound character. Since the fifty-sound table and the data strings therein are already known to those familiar with the Japanese language, use of the system of this invention does not require familiarity with English or any entry system based on English alphabet and sounds. This is particularly desirable since many Japanese do not know or speak English.

System 20 of FIG. 4 can be used for encoding the Japanese Kana characters in a manner similar to the encoding of Chinese characters or Kanji. Thus the keystroke storage 26 stores the data strings for the fifty-sounds table and the associated tables for "twisted" sounds and "voiced" sounds and shape storage 28 the 46 Hiragana and the 46 Katakana characters, as well as the reduced-size symbols for "twisted" sounds and double consonants, and the nigori for some "voiced" sounds. Controller 24 will compare the data strings entered from keyboard 22 to data strings stored in storage 26. Thus when a data string entered is the same as one stored in storage 26, controller 24 will cause the sound character represented by such string to be displayed in the work area or the pending character area of the monitor 30. Controller 24 also detects whether the Katakana shift key is pressed to display the Katakana version instead of the Hiragana. Since the number of possibilities are quite limited with only 46 data strings, the different capabilities of the system in identifying compound character strings, or duplications illustrated in the flow chart of FIGS. 11A, 11B are not required for the encoding of Japanese Kana characters. But aside from such aspects, the flow chart of FIGS. 11A, 11B also illustrate the operation of system 20 for entering Japanese Kana.

An alternative means of accessing the Kana would be to use the Chinese keyboard with its stroke categories as a means of entering data strings to describe the Katakana (which lend themselves to this approach), then obtain the Hiragana equivalents with a shift key. While this causes a high Kana duplication with most stroke classification systems, it is of value as an input approach.

From the above, it is evident that a particularly useful and advantageous system for encoding Chinese characters or Kanji and Japanese Kana characters is disclosed. The system is useful for encoding Chinese and Japanese language characters. It will be understood, however, that the system may also be useful for encoding other types of ideographic characters as well, such as Korean, and that the "compound feature" is useful for other languages—including English—as well. Also such applications are within the scope of the invention.

The above-described embodiments and details are merely illustrative of the invention. The scope of the invention is to be limited only by the appended claims.

I claim:

1. An apparatus for encoding a collection of characters, each characters composed of one or more strokes written in a predetermined writing sequence to make the character, said apparatus comprising:

first means for storing a plurality of strings of code numbers, each string representing a character in the collection, wherein the strokes that make up the characters of the collection are classified into a plurality of groups of one or more strokes, each group corresponding to a predetermined code number, each number in a string representing one of the strokes of the appropriate group, wherein for all the characters in the collection, the order of the code numbers in the string is the same as said predetermined writing sequence of strokes so that the string always begins with the code number for the first stroke of the predetermined writing sequence and follows said sequence without interruption until the end of the string wherein for at least some characters in the collection, the strings representing such characters contain few code numbers than the number of strokes in such characters, so that said at least some characters are uniquely identifiable before entry of all of the strokes of such characters;

second means for storing the shapes of the characters in the collection;

display means for displaying the shapes of the characters in the second storing means;

means for enabling an operator to enter code numbers; and controlling means for comparing the string of code numbers entered by the operator as they are entered to the strings in the first storing means and for causing the display means to display the shape of a character from the second storing means when the code numbers entered by the entering means uniquely identify said character.

2. The apparatus of claim 1, wherein the collection of characters includes the Joyo-Kanji, and wherein the number of strokes in the Joyo-Kanji characters are, on the average, at least 20% greater than the number of code numbers in the strings of code numbers stored in the first storing means representing the Joyo-Kanji characters.

3. The apparatus of claim 1, wherein said enabling means includes means for enabling the entry of an end of character message.

4. The apparatus of claim 3, wherein at least some of the strings of code numbers stored in the first storing means includes a symbol for the end of character message and wherein said controller means responds to the end of character message by causing the display means to display a character from the second storing means when the sequence of code numbers entered, including the end of character message, matches the string of code numbers stored in the first storing means for such character.

5. The apparatus of claim 4, wherein when the sequence of code numbers entered does not match any string of code numbers stored in the first storing means when an end of character message is entered, the controller means will cause the display means to display an error message.

6. The apparatus of claim 1, wherein said enabling means includes means for enabling an operator for accepting a character displayed by the display means.

7. The apparatus of claim 6, wherein the first storing means stores a plurality of compound strings of code numbers for identifying at least two characters which are used together and in a particular order in a language, each compound string comprising the string for a first character ending with a symbol representing the acceptance of the first character by an operator and, immediately following the string for the first character, at least an additional string for a subsequent character wherein, at least for some compound strings, the additional string for the subsequent character in the compound string is shorter than the string stored in the first storing means for such subsequent character when used independently of the first character, wherein the controller means will cause the display means to display the first character and then the subsequent character when a sequence of code numbers entered matches the compound string for the first character followed by the subsequent character.

8. The apparatus of claim 7, wherein for at least some compounds of three or more characters, no further entry for one or more of the characters beyond the second character is required for uniquely identifying the compound.

9. The apparatus of claim 7, wherein when the controller means has caused the display means to display a first character and at least one subsequent character as a result of having identified a compound string for such characters, the sequence of code numbers actually entered after the display of the subsequent character in the compound string includes code numbers different from the code numbers in the compound string corresponding to the subsequent character displayed, the controller means will cause the subsequent character already displayed to be erased and a different character to be displayed where the string of such different character matches said sequence of code numbers actually entered after the end of character message for the first character.

10. The apparatus of claim 6, wherein the display means includes an erasable display screen that has a first display area for pending characters and a second area for accepted characters, wherein the controller means causes the display means to display a character in the first area when the code numbers entered uniquely identifies the character, and wherein when an operator accepts such character by means of the acceptance enabling means, the controller causes the accepted character to be displayed in the second area.

11. The apparatus of claim 6, wherein when an operator accepts a character by means of the acceptance enabling means, the controller means will compare the code numbers entered after the acceptance to the strings of code numbers in the first storing means for identifying a character which follows the accepted character.

12. The apparatus of claim 1, wherein said apparatus further comprising means for indicating entry error to an operator operating the apparatus when the code numbers entered do not match any string stored in the first storing means.

13. The apparatus of claim 12, wherein the indicating means causes the display means to display an error message.

14. The apparatus of claim 12, wherein the indicating means causes a tone to sound to indicate an error message.

15. The apparatus of claim 1, wherein said apparatus further comprising indicating means which causes a tone to sound to indicate that a character has been identified.

16. The apparatus of claim 1, wherein said apparatus further comprising indicating means which causes a voice generator to pronounce a character when it has been identified.

17. The apparatus of claim 1, wherein the groups of strokes are:

a first group including all horizontal strokes. drawn from left to right and all slanting strokes that are drawn on an upward angle from left to right;

a second group including all straight plain vertical strokes;

a third group including all dots, and all curving strokes drawn from top to bottom slanting downwards to the left or right;

a fourth group including all strokes with an upper right corner drawn first from left to right and then sharply downward;

a fifth group including all strokes with a lower left hand corner drawn first downward and then sharply from left to right;

a sixth group including all strokes drawn either straight downward or curved downward, and then ended with a hook to the left; and a seventh group including all strokes with more than one corner.

18. The apparatus of claim 1, wherein the groups of strokes are:

a first group including all horizontal strokes drawn from left to right and all slanting strokes that are drawn on an upward angle from left to right;

a second group including all straight plain vertical strokes;

a third group including all dots, and all curving strokes drawn from top to bottom slanting downwards to the left or right;

a fourth group including all strokes with an upper right corner drawn first from left to right and then sharply downward and of all strokes with a lower left hand corner drawn first downward and then sharply from left to right;

a fifth group including all strokes drawn either straight downward or curved downward, and then ended with a hook to the left; and a sixth group including all strokes with more than one corner

19. The apparatus of claim 1, wherein the groups of strokes are:

a first group including all plain straight strokes drawn from left to right and all straight slanting strokes drawn from left to right;

a second group including all dots and all straight plain strokes of any length drawn from top to bottom, either vertically or diagonally;

a third group including all plain strokes which begin straight and then turn sharply once, or more than once.

20. The apparatus of claim 1, wherein the groups of strokes are:

a first group including all horizontal strokes drawn from left to right and all slanting strokes that are drawn on an upward angle from left to right;

a second group including all straight plain vertical strokes;

a third group, including all dots, and all curving strokes drawn from top to bottom slanting downward to left or right;

a fourth group including all strokes that have one or more corners.

21. The apparatus of claim 1, wherein the groups of strokes include a group that embraces all strokes ending with a hook.

22. The apparatus of claim 1, wherein the plurality of groups each contains one stroke.

23. The apparatus of claim 1, wherein for at least one character, the first storing means stores two or more strings of code numbers representing two or more predetermined writing sequences of said character, and wherein the controller means causes the display means to display said character when the sequence of code numbers entered matches any one of said two or more strings of code numbers stored in the first storing means for such character.

24. The apparatus of claim 23, wherein two or more predetermined writing sequences of said character represent two or more traditional writing sequences of the character in a language.

25. The apparatus of claim 1, wherein at least one character includes a particular stroke which is such that different operators tend to identify the stroke in different groups resulting in two or more different strings of code numbers representing the same character, wherein the first storing means stores the two or more different strings, and wherein the controller means causes the display means to display said character when the sequence of code numbers entered matches any one of said two or more strings of code numbers stored in the first storing means for such character.

26. The apparatus of claim 1, wherein the second storing means stores the shapes of a plurality of partial characters and the first storing means stores a plurality of strings of code numbers representing the strokes in such partial characters, and wherein the controller means causes the shape of a partial character stored in the second storing means to be displayed by the display means when the code numbers entered uniquely identifies the string for such partial character stored in the first storing means.

27. The apparatus of claim 1, wherein said display means includes a screen for displaying characters, said screen having a first area for displaying characters which have been correctly entered, a second area for displaying characters identified by the controller means as candidates for strings of code numbers entered and a third area for displaying the sequence of strokes which has been entered.

28. The apparatus of claim 27, wherein the second storing means stores the shapes of a plurality of partial characters and the first storing means stores a plurality of strings of code numbers representing the strokes in such partial characters, and wherein the controller means causes the shape of a partial character stored in the second storing means to be displayed by the display means when the code numbers entered uniquely identifies the string for such partial character stored in the first storing means.

29. The apparatus of claim 28, wherein when the controller means causes the shape of a partial character to be displayed, it is displayed in the third area.

30. A method for encoding a collection of Chinese characters, each character composed of one or more strokes written in a predetermined writing sequence to make the character, said method comprising:

storing a plurality of strings of code numbers, each string representing a character in the collection, wherein the strokes that make up the characters of the collection are classified into a plurality of groups of one or more strokes, each group corresponding to a predetermined code number, each number in a string representing one of the strokes of the appropriate group, wherein the order of the code numbers in the string is the same as said predetermined writing sequence of strokes so that the string always begins with the code number for the first stroke of the predetermined writing sequence and follows said sequence without interruption wherein for at least some characters in the collection, the strings representing such characters contain fewer code numbers than the number of strokes in such characters;

storing the shapes of the characters; and comparing the string of code numbers entered by an operator as they are entered to the strings stored and displaying the shape of a character when the code numbers entered by the operator uniquely identify said character.

* * * * *